(12) United States Patent
Yunker et al.

(10) Patent No.: US 6,780,053 B1
(45) Date of Patent: Aug. 24, 2004

(54) PLUGGABLE SMALL FORM FACTOR TRANSCEIVERS

(75) Inventors: Bryan Yunker, Longmont, CO (US); Andrew Moore, Broomfield, CO (US); Susan Tower, Boulder, CO (US)

(73) Assignee: Picolight Incorporated, Boulder, CO (US)

( * ) Notice: Subject to any disclaimer, the term of this patent is extended or adjusted under 35 U.S.C. 154(b) by 487 days.

(21) Appl. No.: 09/635,102

(22) Filed: Aug. 9, 2000

(51) Int. Cl.[7] .......................................... H01R 13/648
(52) U.S. Cl. .................... 439/607; 436/607; 436/567; 455/90.3
(58) Field of Search ............................ 455/73, 90, 90.3, 455/575.1, 575.4; 385/49, 88, 92; 439/607, 567, 598

(56) References Cited

U.S. PATENT DOCUMENTS

| | | |
|---|---|---|
| 5,117,476 A | 5/1992 | Yingst et al. |
| 5,535,034 A | 7/1996 | Taniguchi |
| 5,546,281 A | 8/1996 | Poplawski et al. |
| 5,717,533 A | 2/1998 | Poplawski et al. |
| 5,812,582 A * | 9/1998 | Gilliland ...................... 372/50 |
| 5,864,468 A | 1/1999 | Poplawski et al. |
| 5,879,173 A * | 3/1999 | Poplawski .................. 438/138 |
| 6,000,856 A * | 12/1999 | Yunker ........................ 385/75 |
| 6,024,500 A | 2/2000 | Wolf |
| 6,201,704 B1 | 3/2001 | Poplawski et al. |
| 6,203,336 B1 * | 3/2001 | Nakamura .................... 439/80 |
| 6,206,582 B1 | 3/2001 | Gilliland |
| 6,267,606 B1 | 7/2001 | Poplawski et al. |
| 6,307,659 B1 | 10/2001 | Gilliland et al. |
| 6,350,063 B1 | 2/2002 | Gilliland et al. |
| 6,368,153 B1 * | 4/2002 | Hwang ...................... 439/607 |
| 6,369,924 B1 * | 4/2002 | Scharf ........................ 359/152 |
| 6,459,517 B1 * | 10/2002 | Duncan et al. ............. 398/135 |
| 6,517,382 B2 | 2/2003 | Flickinger et al. |
| 6,524,134 B2 | 2/2003 | Flickinger et al. |

* cited by examiner

Primary Examiner—William Trost
Assistant Examiner—Brandon Miller
(74) Attorney, Agent, or Firm—Jagtiani + Guttag

(57) ABSTRACT

The present invention provides a transceiver housing comprising: an opening at a proximal end thereof for receiving a optical receptacle; an electrical contact for engaging the optical receptacle and retaining the optical receptacle in the housing body; and a first side and a second side, each of the first side and the second side including mountings for mounting a printed wire assembly within the housing. In a preferred embodiment, the transceiver housing of the present invention has a uni-body construction. The present invention also provides transceiver cage comprising: a hollow cage body made of metal for mounting a transceiver within the transceiver cage and for preventing radiation from outside the cage body from entering the cage body and for preventing radiation from the transceiver from exiting the cage body; a plurality of mounting pins extending from the cage body for mounting the transceiver on a printed wiring board; and a plurality of internal contact fingers at a proximal open end of the hollow cage body for engaging a chassis through which the transceiver cage is inserted. In a preferred embodiment, the transceiver cage of the present invention includes a latch release mechanism for holding a transceiver in the transceiver cage and a hinged access door for providing access to a connector mounted within the transceiver cage. In addition, the present invention provides a transceiver system including a transceiver cage having radiation control openings with a longest dimension no greater than ¼ of the wavelength of the electromagnetic radiation corresponding to ten times the highest signal frequency present in the transceiver cavity.

16 Claims, 15 Drawing Sheets

PLUGGABLE SMALL FORM FACTOR TRANSCEIVERS

CROSS-REFERENCE TO RELATED APPLICATIONS

This application makes reference to the following co-pending U.S. Patent Applications. The first application is U.S. application Ser. No. 09/281,982, entitled "Fiber Optic Ferrule," filed Mar. 31, 1999. The second application is U.S. application Ser. No. 09/389,220, entitled "Enclosure for Optical Subassembly Having Mechanical Alignment Features," filed Sep. 3, 1999. Both of these application are hereby incorporated by reference.

BACKGROUND OF THE INVENTION

1. Field of the Invention

The present invention relates generally to optical transceivers, transceiver housings, and transceiver cages or mountings.

2. Description of the Prior Art

Despite the various attempts to make better housings and mountings for optical transceivers, there continues to exist a need for housings and mountings that are simple to manufacture and provide consistent electrical properties. For example, most typical transceiver housings are made from multiple pieces that must be soldered or otherwise fixed together. The necessity of soldering the pieces together makes the manufacture of the transceiver housing more complicated. The presence of otherwise continuous unsoldered gaps between the pieces would negatively affect the electrical properties of the housing, such as electromagnetic performance.

With respect to mountings for optical transceivers, a typical transceiver cage provides inconsistent electrical contact with the chassis through which the cage protrudes and allows considerable electromagnetic radiation to escape through the opening in the chassis where the cage is mounted due to non-continuous conduction of magnetic flux to electric current or ground potential.

SUMMARY OF THE INVENTION

It is therefore an object of the present invention to provide a transceiver housing that may be manufactured from a single sheet of material or from pieces that behave as a continuous material.

It is another object of the present invention to provide a transceiver housing in which electromagnetic radiation within the housing is directed continuously without perturbation by the flow of current on the surface of the housing.

It is yet another object of the present invention to provide a transceiver cage for a transceiver system that may be manufactured from a single sheet of material, or pieces that behave as a continuous material.

It is yet another object of the present invention to provide a transceiver cage for a transceiver system that is effective in preventing the flow of electromagnetic radiation between the interior of the host chassis and the external environment surrounding the host chassis.

According to a first broad aspect of the present invention, there is provided a transceiver housing comprising: an opening at a proximal end thereof for receiving a transceiver; a plurality of contact fingers extending from the proximal end for engaging the transceiver and retaining the transceiver in the housing body; and a first side and a second side, each of the first side and the second side including mounting means for mounting a printed wire assembly within the transceiver housing.

According to a second broad aspect of the invention, there is provided a transceiver cage comprising: a hollow cage body made of metal for mounting a transceiver within the transceiver cage and for preventing radiation from outside the cage body from entering the cage body and for preventing radiation from the transceiver from exiting the cage body; a plurality of mounting pins extending from the cage body for mounting the transceiver on a printed wiring board; and a plurality of internal contact fingers at a proximal open end of the hollow cage body for engaging a chassis through which the transceiver cage is inserted and for engaging the transceiver.

According to a third broad aspect of the invention, there is provided an optoelectronic device comprising: a transceiver cage; and a transceiver mounted in the transceiver cage, wherein the transceiver cage includes radiation control openings therein, each of the radiation control openings having a maximum width no greater than ¼ of the wavelength of the electromagnetic radiation corresponding to ten times the highest signal frequency present in the transceiver circuitry.

According to a fourth broad aspect of the invention, there is provided a transceiver housing and cage system comprising: a transceiver cage including: a hollow cage body made of metal for mounting a transceiver within the transceiver cage and for preventing radiation from outside the cage body from entering the cage body and for preventing radiation from the transceiver from exiting the cage body; a plurality of mounting pins extending from the cage body for mounting the transceiver cage on a printed wiring board; a plurality of internal contact fingers at a proximal open end of the hollow cage body for engaging a chassis through which the transceiver cage is inserted; a transceiver housing mounted in the transceiver cage, the transceiver housing including: an opening at a proximal end thereof for receiving a optical receptacle; a plurality of contact fingers extending from the proximal end for engaging the optical receptacle and retaining the optical receptacle in the housing body; and a first side and a second side, each of the first side and the second side including mounting means for mounting a printed wire assembly within the transceiver housing.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Figure 1A:
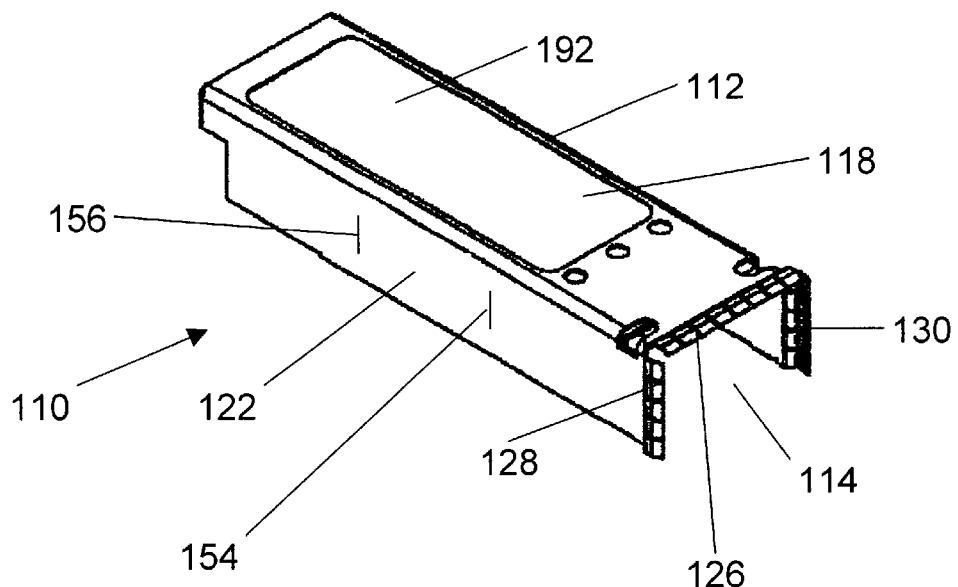
FIG. 1A is a top perspective view of a transceiver housing of one embodiment of the present invention.
Figure 1B:
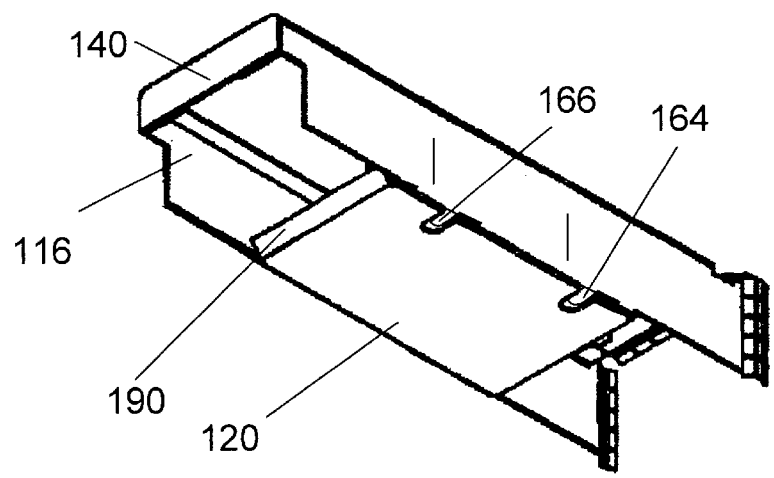
FIG. 1B is a bottom perspective view of the transceiver housing of FIG. 1A.
Figure 1C:
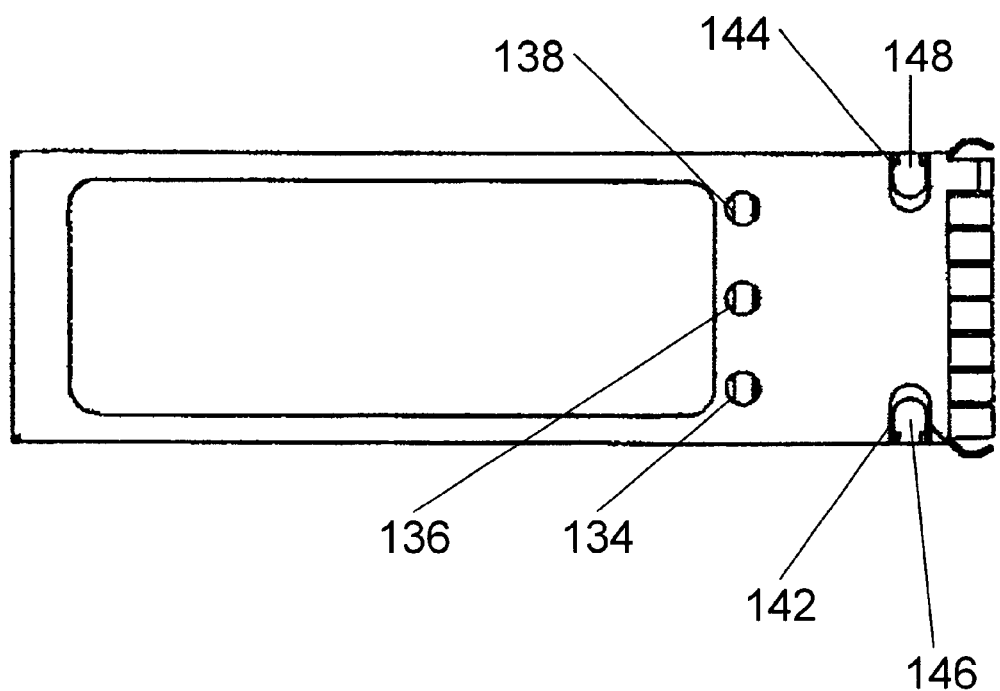
FIG. 1C is a top plan view of the transceiver housing of FIG. 1A.
Figure 1D:
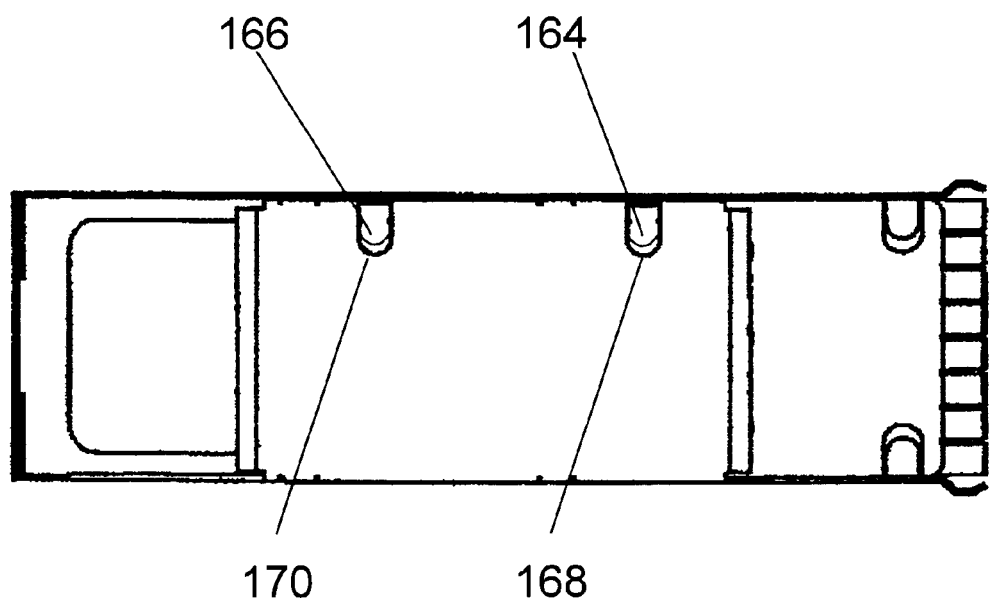
FIG. 1D is a bottom plan view of the transceiver housing of FIG. 1A in a locked configuration.
Figure 1E:
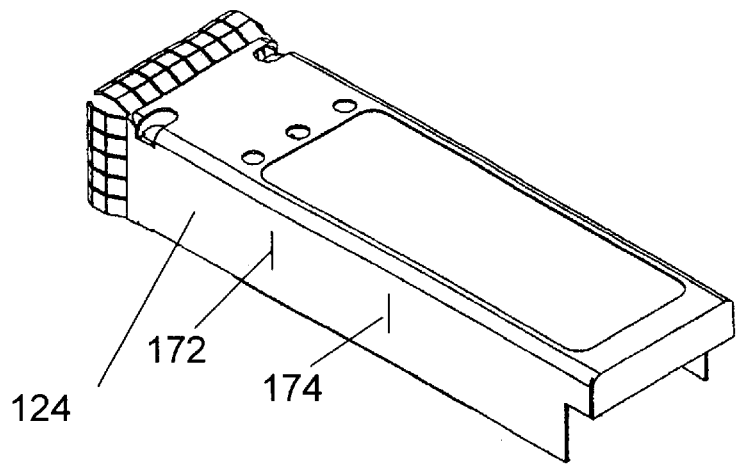
FIG. 1E is a top perspective view of the transceiver housing of FIG. 1A from a different angle.
Figure 1F:
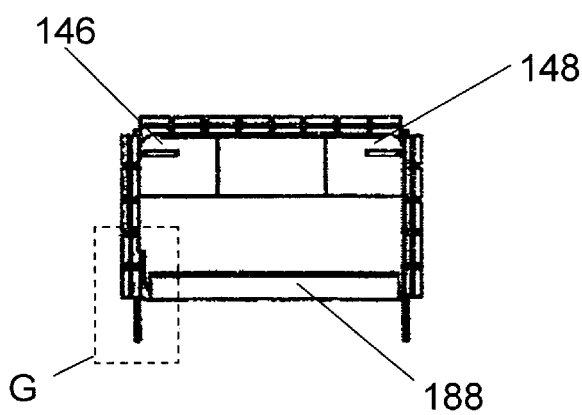
FIG. 1F is a proximal view of the transceiver housing of FIG. 1A.
Figure 1G:
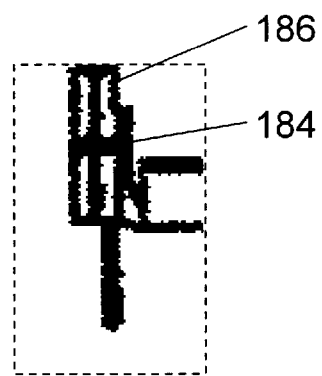
FIG. 1G is an expanded view of the region labeled "G" in FIG. 1F.
Figure 1H:
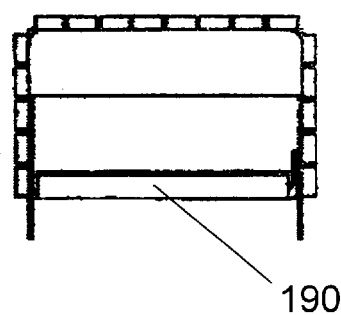
FIG. 1H is a distal view of the transceiver of FIG. 1A.

It is advantageous to define several terms before describing the invention. It should be appreciated that the following definitions are used throughout this application.

Definitions

For the purposes of the present invention, the term "proximal" refers to the end of a transceiver housing or transceiver cage of the present invention that includes engaging contact fingers for electromagnetic emissions control.

For the purposes of the present invention, the term "distal" refers to the end of a transceiver housing or transceiver cage of the present invention opposite to the proximal end that does not include engaging contact fingers.

For the purposes of the present invention, the terms "left" and "right" refer to the left and right sides of a transceiver housing or transceiver cage as viewed from the proximal end of the transceiver housing or transceiver cage.

For the purposes of the present invention, the term "uni-body construction" refers to a transceiver housing or transceiver cage that may be made from a single piece of material.

For the purposes of the present invention, the term "integrally formed" refers to any feature such as tabs, pins, supports, clips, dimples, etc. that are part of a uni-body construction.

For the purposes of the present invention, the term "contact fingers" refers to two or more features meant for making electrical contact between a transceiver housing and a receptacle or between a transceiver cage and a chassis such that relative movement between any 2 contact fingers is sufficient to allow electrical contact by both fingers in the presence of mechanical misalignment which would otherwise prevent both contact fingers from achieving electrical contact.

For the purposes of the present invention, the term "OSA" refers to any Optical Sub-Assembly. These sub-assemblies include, but are not limited to: optical elements, electro-optic devices, optoelectronic devices, mechanical alignment structures, electronic devices, and interconnect means.

For the purposes of the present invention, the term "dimension" refers to any straight line distance across any shaped opening, whether the opening is circular, oval or any other shape.

For the purposes of the present invention, the term "longest dimension" refers to the longest dimension for a particular opening.

For the purposes of the present invention, the term "contact finger spacing" refers to the distance between the contact fingers of a finger type electrical contact of the present invention.

For the purposes of the present invention, the term "maximum bend radius" refers to maximum distance that a bend of a contact finger/bent electrical contact of a transceiver housing or transceiver cage of the present invention extends beyond the surface of the transceiver housing or transceiver cage, respectively.

For the purposes of the present invention, the term "maximum data rate of data" refers to the maximum rate that data may be transferred to or from a transceiver.

Description

FIGS. 1A, 1B, 1C, 1D, 1E, 1F, 1G, and 1H illustrate a transceiver housing 110 of the present invention. Transceiver housing 110 includes a body portion 112 including a proximal open end 114, a distal open end 116, a top portion 118, a bottom portion 120, a left side 122 and a right side 124. Proximal open end 114 includes eight top portion external contact fingers 126, five left side external contact fingers 128, and five right side external contact fingers 130. Top portion 118 includes three circular openings 134, 136 and 138 for airflow and the flow of cleaning fluid into and out of transceiver housing 110. Extending from top portion 118 is a top portion distal flap 140. Top portion 118 also includes a left semi-oval opening 142 and a right semi-oval opening 144. A left retaining tab 146 is located beneath left semi-oval opening 142 and a right retaining tab 148 is located beneath a right semi-oval opening 144. It should be appreciated that the openings and associated tabs may be of any convenient shape. Left side 122 includes two dimples or holding fingers 154, 156 for holding a PWA (not shown in FIGS. 1A through 1H). Extending from left side 122 are two tabs 164, 166 for engaging and restraining bottom portion 120. Tabs 164 and 166 fit into cut-outs 168 and 170, respectively. Right side 124 includes two holding fingers 172, 174 for holding a PWA (not shown in FIGS. 1A through 1H). Extending vertically from bottom portion 120 is a vertical flap 184 that abuts against an interior portion 186 of left side wall 122. Also extending vertically from bottom portion 120 are a proximal flap 188 and a distal flap 190. Transceiver housing 110 also includes a structural recess 192.

Although the transceiver housing illustrated in FIGS. 1A, 1B, 1C, 1D, 1E, 1F, 1G, and 1H uses circular openings for airflow and the flow of cleaning fluid into and out of the transceiver housing, it should be appreciated that openings having shapes other than circular may be utilized. Whatever the shapes of the openings, preferably each of the openings has a longest dimension no greater than ¼ of the wavelength of the electromagnetic radiation corresponding to ten times the highest signal frequency present in the transceiver circuitry.

Although the transceiver housing illustrated in FIGS. 1A, 1B, 1C, 1D, 1E, 1F, 1G, and 1H uses external contact fingers as contacts for the proximal open end of the transceiver housing, other forms of conventional contacts may also be employed in the present invention.

Although the transceiver housing illustrated in FIGS. 1A, 1B, 1C, 1D, 1E, 1F, 1G, and 1H is illustrated having a particular number of contact fingers, the transceiver housing may have other number of contact fingers.

Transceiver housing 110 may have a uni-body construction, i.e. transceiver 110 may be formed from a single sheet of metal by known metal stamping and metal working techniques. In a preferred embodiment, housing 110 is constructed from steel, copper or metal alloys which have good electrical conductivity. Transceiver housing 110 is made into a completed unit by folding a single sheet, formed, for example, by etching or stamping, and bending tabs 164 and 166 into cut-outs 168 and 170 in bottom portion 120.

Although one preferred way for forming the transceiver housing of the present invention is described above, the transceiver housing of the present invention may be made in a variety of ways such as die cast assemblies of parts.

The design of the transceiver housing of the present invention includes contacts, such as contact fingers shown above, at the open end of the housing for making continuous electrical contact with the inner surface of a host system receptacle into which the housing is inserted. The housing of the present invention provides a minimally apparent aperture to minimize the wavelength of any electromagnetic energy available to pass through openings in the housing to receptacle to transceiver housing interface. The benefits of minimizing the apparent aperture are described in U.S. application Ser. No. 09/389,220, entitled "Enclosure for Optical Subassembly Having Mechanical Alignment Features," filed Sep. 3, 1999, the entire disclosure and contents of which are incorporated by reference. The housing of the present invention may include a relatively high number of contact fingers, preferably 5 to 10 contact fingers per side, to maximize the probability and quality of the electrical contact in the case of misalignment or tolerancing between the chassis opening, transceiver cage contact fingers and/or transceiver housing contact fingers and to minimize the apertures formed between the contact fingers. Maximizing the probability and quality of the electrical contact in this way results in minimizing the electromagnetic radiation from the transceiver and minimizing the susceptibility of the transceiver to the effects of electrostatic discharge by providing the lowest resistance path to the housing for static discharge and preventing apertures formed by a chassis/cage misalignment. In addition, the spacing between the contact fingers is preferably kept small so that the contact fingers have a contact finger spacing less than ¼ of the wavelength of the electromagnetic radiation corresponding to ten times the highest frequency of the clock frequency of the optoelectronic device of which the transceiver is a part.

Also, because the transceiver housing of the present invention may be made from a single piece of material, the flow of electric current on the surface of the housing will tend to flow circularly around without discontinuities that would allow an electric or magnetic field to be concentrated such that an electromagnetic field could be excited externally to the housing.

The design of the transceiver housing utilizes an area recessed from the plane of the top of the transceiver housing to create 3 divisional structural members to increase the rigidity of the housing. The transceiver housing includes dimples or holding fingers to provide simultaneous lateral, linear and vertical restraints of a printed wire assembly (PWA) mounted within, thereby protecting the electrical leads of the Optical Sub-assembly (OSA) from the strain of insertions and removals of the transceiver. The transceiver housing also captures the OSA housed within the transceiver housing and transmits force from the PWA edge connector to the OSA body as gripped by a user.

Preferred materials for making the transceiver housing of the present invention are electrically conductive ductile metals such as steel, copper and other metals that may be easily bent to form the transceiver housing. The various contact fingers of the transceiver housing may be formed by stamping or chemically etching the contact fingers and then bending the contact fingers using known metal working techniques. Similarly, the various tabs of the transceiver housing may be formed by stamping or chemically etching the shape of the tabs, and, in some cases bending the tabs into the appropriate positions. Alternatively, the transceiver housing may be constructed by other means such as die casting, using suitable metals such as zinc.

Figure 2A:
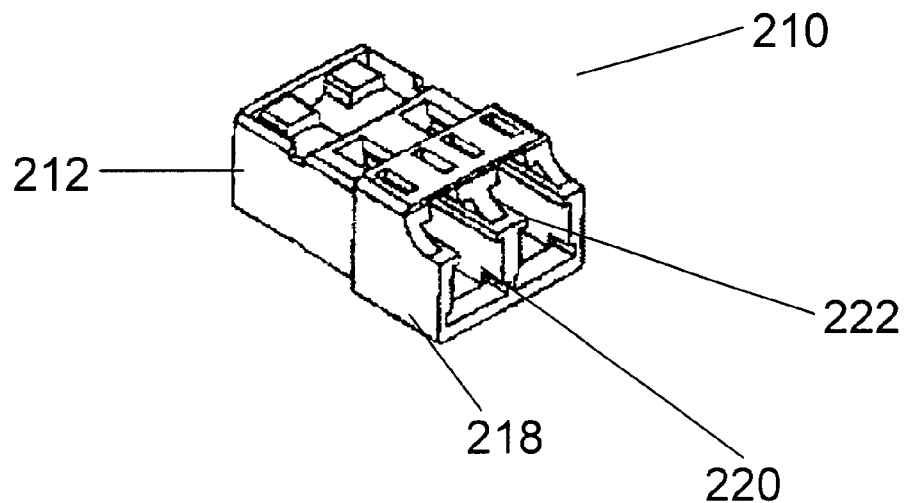
FIG. 2A is a perspective view of an optical connector for use with the transceiver housing of FIG. 1A.
Figure 2B:
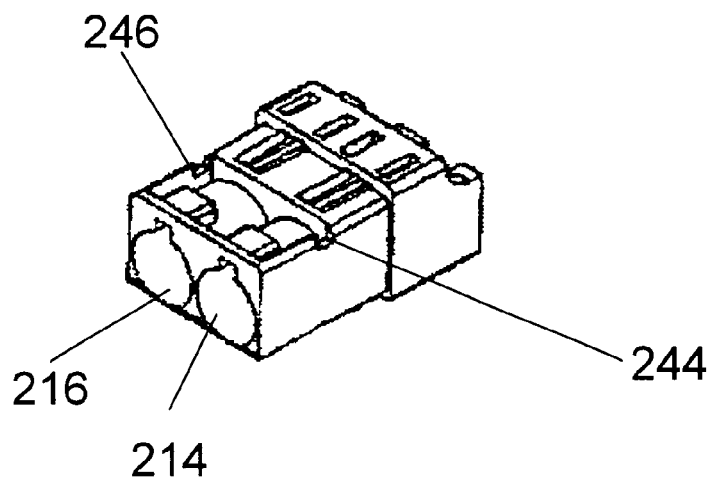
FIG. 2B is a perspective view of the optical connector of FIG. 2A from a different angle.

FIGS. 2A and 2B illustrate a preferred optical receptacle 210 for inserting and mounting in transceiver housing 110. Optical receptacle 210 includes a distal end 212 having two recesses 214 and 216, which may be cylindrical as shown, in which active optoelectronic components (not shown) may be mounted. Optical receptacle 210 also includes a proximal end 218 having two plug receptacles 220 and 222 into which an LC style duplex connector (not shown) may be plugged. Optical receptacle 210 also includes a left and right notches 244, 246 to receive transceiver housing left and right retaining tabs 146, 148.

The optical receptacle of the present invention may be made of either an insulating material such as plastic or a conductive material such as metal. such as, for example, steel, copper, or a plastic with a conductive coating, or a plastic with conductive fillers.

Figure 3A:
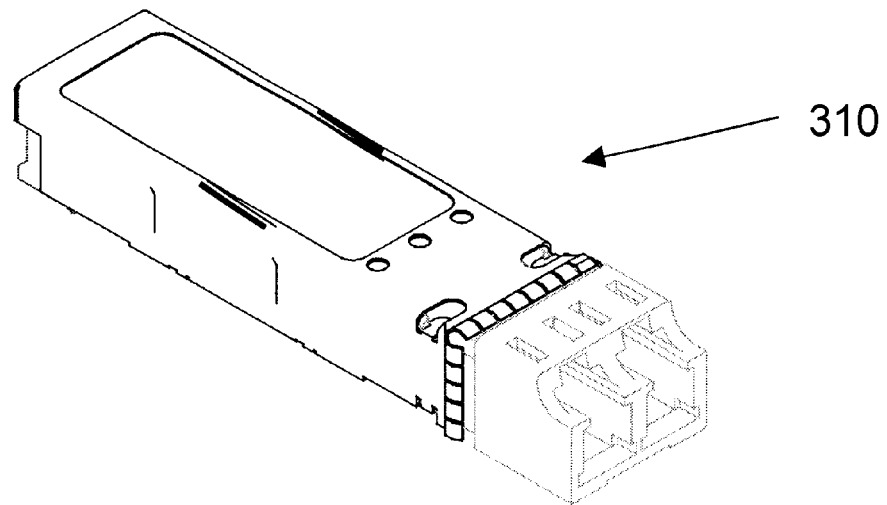
FIG. 3A is a perspective view of a transceiver of the present invention employing the transceiver housing of FIG. 1A and the optical receptacle of FIG. 2.
Figure 3B:
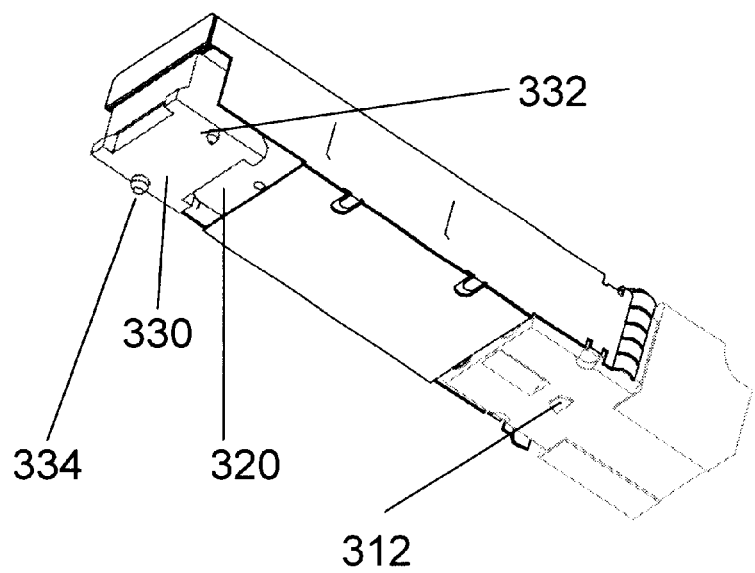
FIG. 3B is a perspective view of the transceiver of FIG. 3A from a different angle.
Figure 4A:
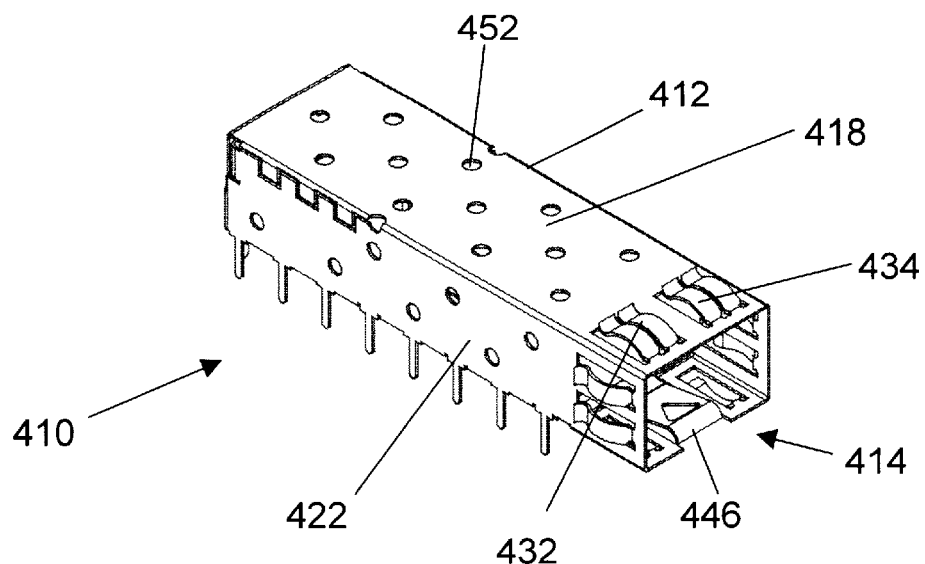
FIG. 4A is a top perspective view of a transceiver cage of the present invention.
Figure 4B:
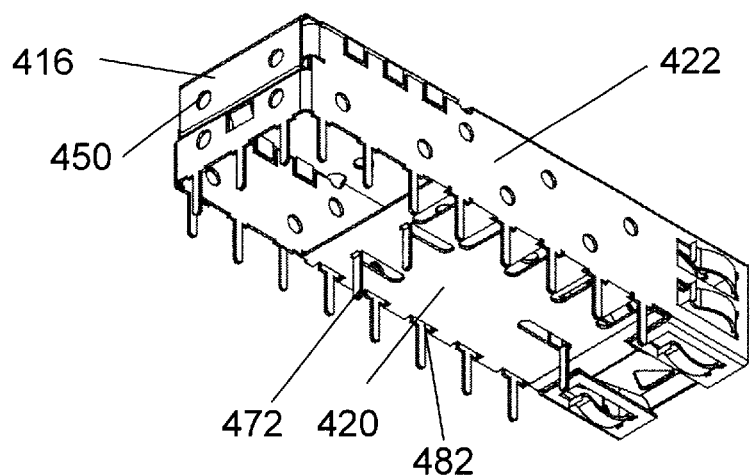
FIG. 4B is a bottom perspective view of the transceiver cage of FIG. 4A.
Figure 4C:
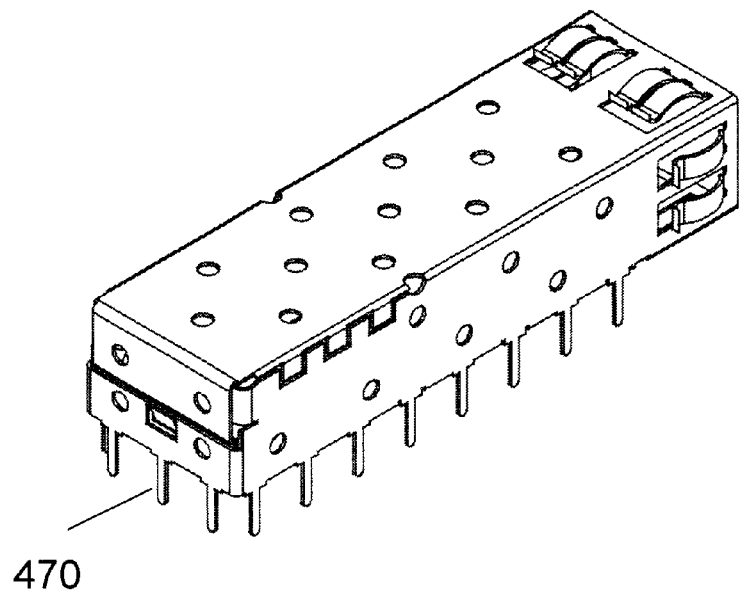
FIG. 4C is a top perspective view of the transceiver cage of FIG. 4A from a different angle.
Figure 4D:
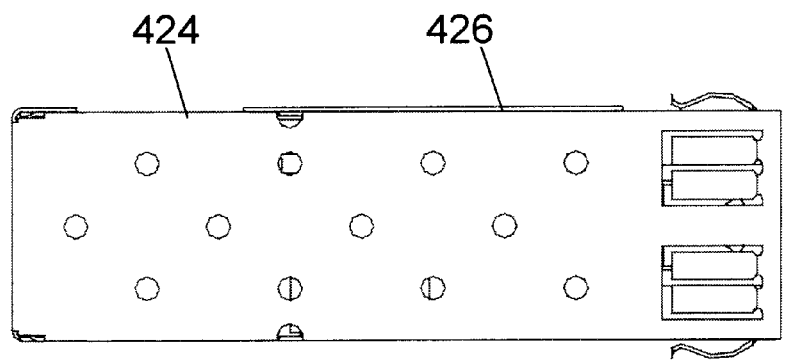
FIG. 4D is a top plan view of the transceiver cage of FIG. 4A.
Figure 4E:
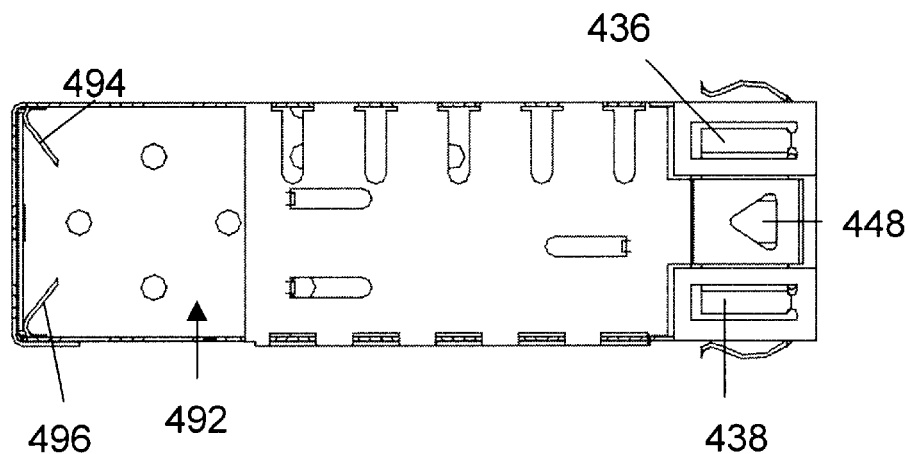
FIG. 4E is a bottom plan view of the transceiver cage of FIG. 4A.
Figure 4F:
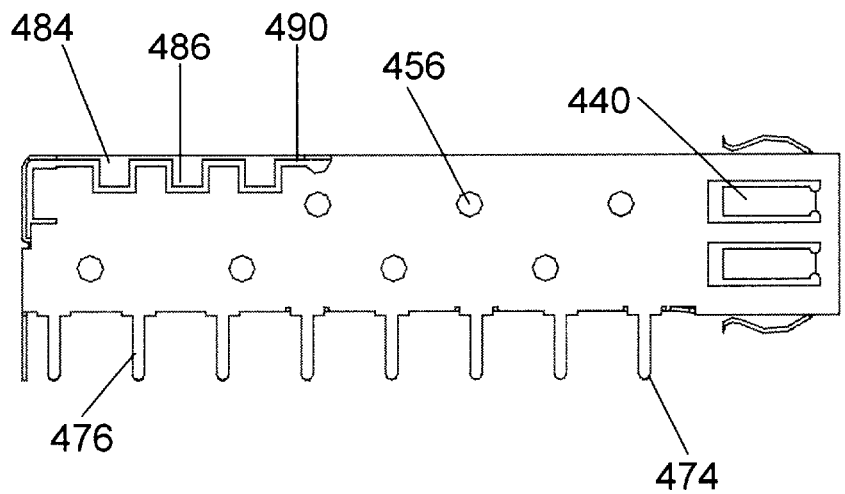
FIG. 4F is a left plan view of the transceiver cage of FIG. 4A.
Figure 4G:
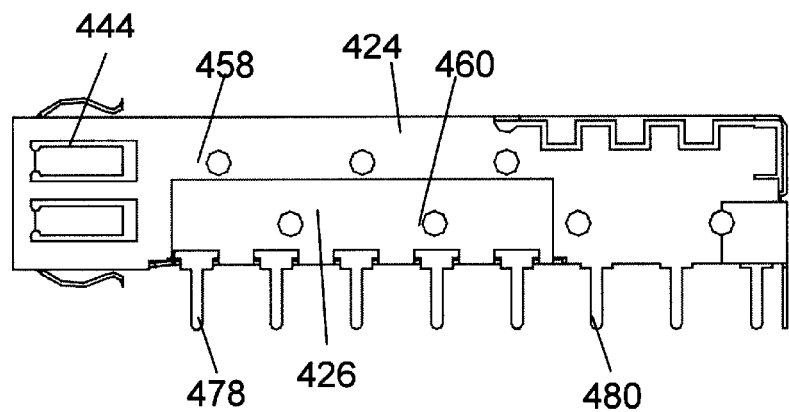
FIG. 4G is a right plan view of the transceiver cage of FIG. 4A.
Figure 4H:
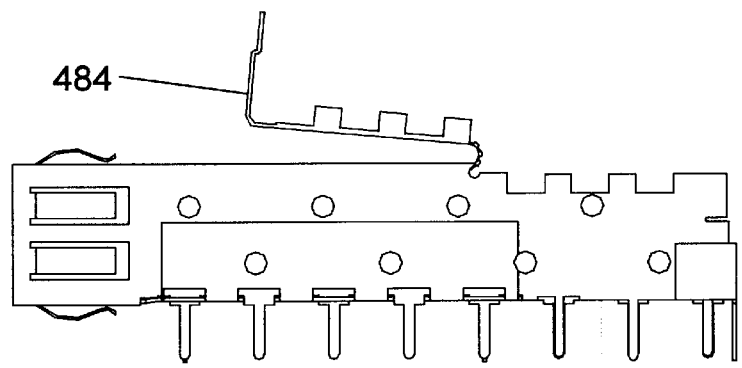
FIG. 4H is a right plan view of the transceiver of FIG. 4F with an access door of the transceiver cage in an open position.
Figure 4I:
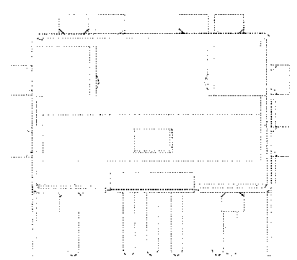
FIG. 4I is a proximal view of the transceiver cage of FIG. 4A.
Figure 4J:
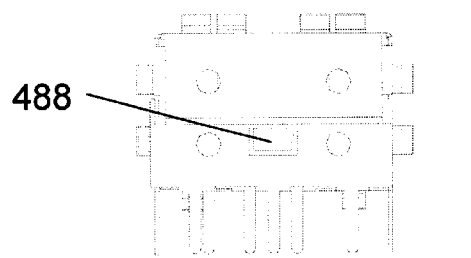
FIG. 4J is a distal view of the transceiver cage of FIG. 4A.

FIGS. 3A and 3B illustrate a transceiver 310 of the present invention including transceiver housing 110 and optical receptacle 210 which is inserted into transceiver housing 110. Top portion external contact fingers 126, left side external contact fingers 128, and right side external contact fingers 130 have a spring action that allow contact fingers 126, 128 and 130 to be spread to allow for insertion of optical receptacle 210 into proximal open end 114 of transceiver housing 110. Once optical receptacle 210 is inserted in proximal open end 114, contact fingers 126, 128 and 130 spring back to provide electrical contact to a transceiver cage (shown in FIG. 4A) after insertion. Optical receptacle 210 is further held in place by left retaining tab 146 engaging left notch 244 and right retaining tab 148 engaging right notch 246. Transceiver housing 310 includes a triangular pin 312 on optical receptacle 210. A PWA 320 is mounted and held in place by dimples or holding fingers 154, 156, 172, and 174 (not visible in FIGS. 3A and 3B). A receptacle 330 mounted on a circuit board (shown in FIGS. 3A and 3B) fits inside distal open end 116 and includes mounting studs 332 and 334. Receptacle 330 includes a recess (not visible in FIGS. 3A and 3B) into which PWA 320 is inserted, thereby electrically connecting PWA 320 to receptacle 330 and, thereby, to the printed circuit board on which receptacle 330 is mounted.

FIGS. 4A, 4B, 4C, 4D, 4E, 4F, 4G, 4H, 4I, and 4J illustrate a transceiver cage 410 of the present invention for use with transceiver 310. Transceiver cage 410 includes a body portion 412 including a proximal open end 414, a distal wall 416, a top portion 418, a bottom portion 420, a left side 422, a right side 424, and a right side flap 426. Proximal open end 414 includes two top left internal contact fingers 432, two top right internal contact fingers 434, one bottom left internal contact finger 436, one bottom right internal contact finger 438, two left internal contact fingers 440, two right internal contact fingers 444, and a catch 446 including a triangular opening 448.

Distal wall 416 includes radiation control openings 450, top portion 418 includes radiation control openings 452, left side 422 includes radiation control openings 456, right side 424 includes radiation control openings 458, and right side flap includes radiation control openings 460. Extending from distal wall 416 are distal mounting pins 470, extending from bottom portion 420 are bottom mounting pins 472, extending from left side 422 are left proximal mounting pins 474 and left distal mounting pins 476, and extending from right side 424 are right proximal mounting pins 478 and right distal mounting pins 480. Right proximal mounting pins 478 extend through locking openings 482 in bottom portion 420, thereby causing right side flap 426 to abut against and be in electrical contact with right side 424. Left side 422 includes an access door 484 with zig zag slot 486 for EMI control. Access door 484 provides access to receptacle 330 mounted in transceiver cage 410 for inspection or rework to insure that there are no loose pieces to track or align. A door latch 488 keeps access door 484 in place when closed. A hinge 490 is formed from etched or stamped lines to allow several actuations of door 484 without metal fatigue breakage. In use, transceiver cage 410 is mounted on a printed wiring board (shown in FIGS. 5A and 5B). An opening 492 (see FIG. 4D) in transceiver cage 410 allows receptacle 330 (not shown in FIG. 4D) mounted on the printed wiring board to extend into transceiver cage 410 and make contact with electrical contacts (not shown) of the PWA 320 (not shown) mounted underneath transceiver 310. Two springs 494 and 496 aid in ejecting transceiver 300 (not shown in FIG. 4D) from transceiver cage 410

The transceiver cage of the present invention may be mounted onto the host PWA by soldering the mounting pins into the host PWB or by pressing the mounting pins into undersized openings that allow the mounting pins to be held in place by the force of friction.

The transceiver cage of the present invention includes contact fingers at the proximal open end that are intended to make continuous electrical contact around the inner surface of a chassis panel through which the transceiver cage is inserted and from which the transceiver cage protrudes. The design of the transceiver cage provides a minimal open aperture between the internal contact fingers to minimize the wavelength of any electromagnetic energy available to pass through the chassis opening. The transceiver cage of the present invention also provides a high number of contact fingers which maximize the probability and quality of electrical contact in the case of misalignment between the chassis and the cage and in the case of a non-optimally dimensioned chassis opening. For these reasons, the design of the transceiver housing of the present invention minimizes electromagnetic radiation from the chassis to the cage interface and provides a low resistance path between the receptacle and chassis for electrostatic discharge currents.

The transceiver cage of the present invention includes mounting pins protruding from the bottom of the transceiver cage in sufficient quantity to minimize the physical spacing so as to minimize the electromagnetic aperture and wavelength of any electromagnetic radiation that may be available to pass through. The large number of mounting pins also ensure a short return path for electromagnetic currents attempting to reach the chassis or signal potential in the host PWA. The mounting pins have a pin length sufficient to hold the cage rigidly in the host PWA during the soldering process and to ensure overlap of the mounting pins and the deepest grounding or signal common plane in the PWB for the shortest electromagnetic return path.

The design of the transceiver cage allows the transceiver cage to be made from a continuous piece of metal and reduces the metal to metal interfaces to one, providing a large area and continuous overlap at the interface seams and to maximize EMI performance of the cage by providing minimal impedance to electromagnetic currents flowing around the cross section of the cage.

The radiation control openings facilitate convective or forced air flow through the cage, facilitate the entry and exit of PWA washing fluids, and minimize the wavelength of electromagnetic energy that may be available to escape from or pass into the transceiver cage. Preferably, the longest dimension of each of the radiation control openings is no greater than ¼ of the wavelength of the electromagnetic radiation corresponding to ten times the highest signal frequency present in the transceiver circuitry.

Figure 5A:
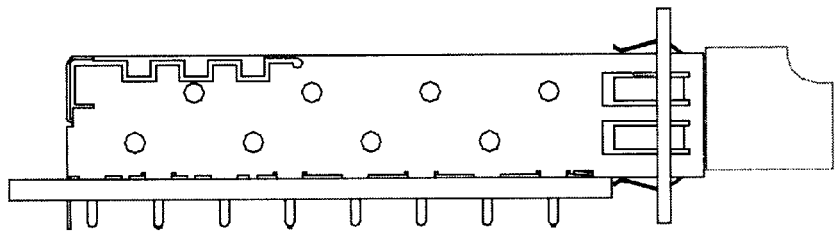
FIG. 5A is a left plan view of the transceiver of FIG. 4 mounted in the cage of FIG. 4A which is in turn mounted in a chassis.
Figure 5B:
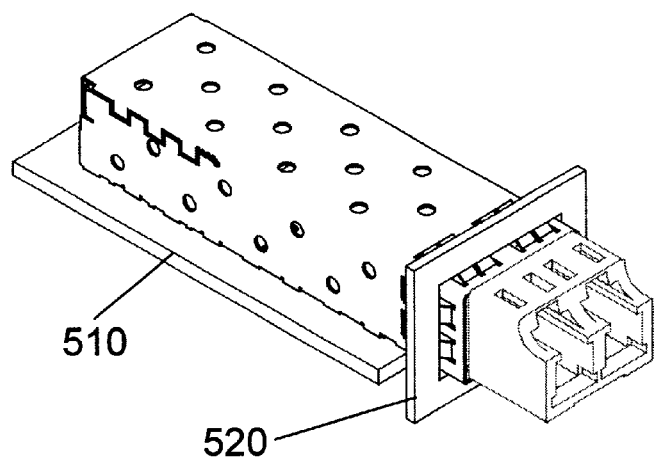
FIG. 5B is a perspective view of the transceiver, cage and chassis of FIG. 5A.

FIGS. 5A and 5B illustrate transceiver 310 mounted in transceiver cage 410 which is in turn mounted on a printed wiring board 510. In use, transceiver 310 is inserted into transceiver cage 410 so that triangular pin 312 catches on triangular opening 448 of catch 446. Transceiver cage 410 extends through a chassis 520 and makes electrical contact with chassis 520 through left internal contact fingers 432, right internal contact fingers 434 (not visible), bottom left internal contact finger 436 (not visible), bottom right internal contact finger 438 (not visible), left internal contact fingers 440 (not visible), and right internal contact fingers 444 (not visible).

Figure 6:
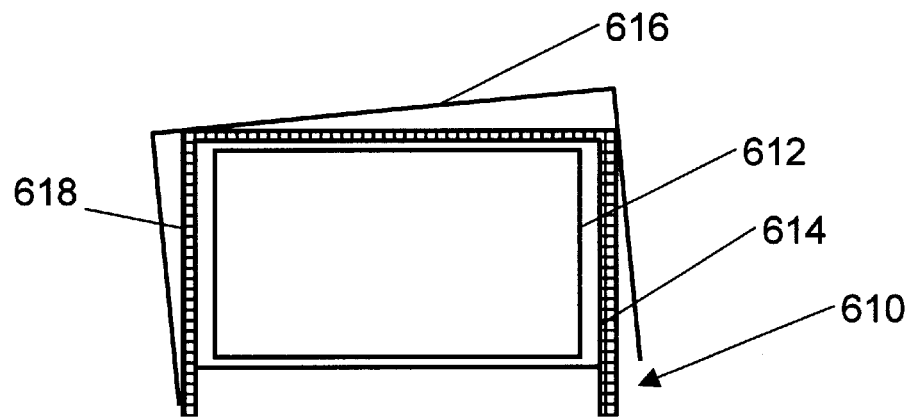
FIG. 6 illustrates in schematic form a conventional transceiver system mounted askew in a chassis.

FIG. 6 illustrates a conventional transceiver system 610 including a transceiver 612 and cage 614. Transceiver system 610 is mounted askew in a chassis 616. As can be seen, when the transceiver 610 is mounted askew in chassis 616, contacts 618 on cage 614 make relatively poor contact with chassis 616 to the relatively small distance that contacts 618 extend from cage 610.

Figure 7A:
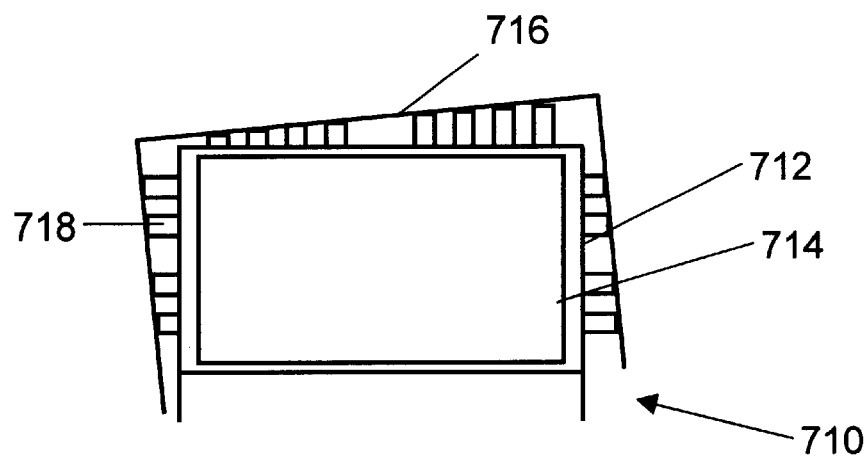
FIG. 7A illustrates in schematic form a transceiver system of the present invention mounted askew in a chassis.
Figure 7B:
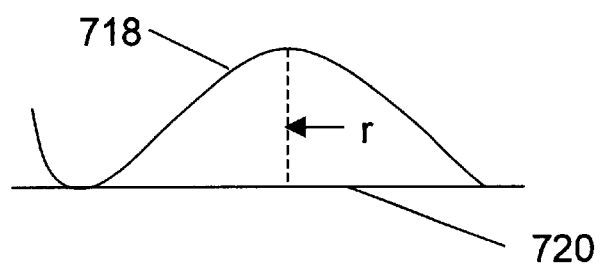
FIG. 7B is a cross-sectional view in schematic form of a contact finger of the transceiver system of FIG. 7A.
Figure 8A:
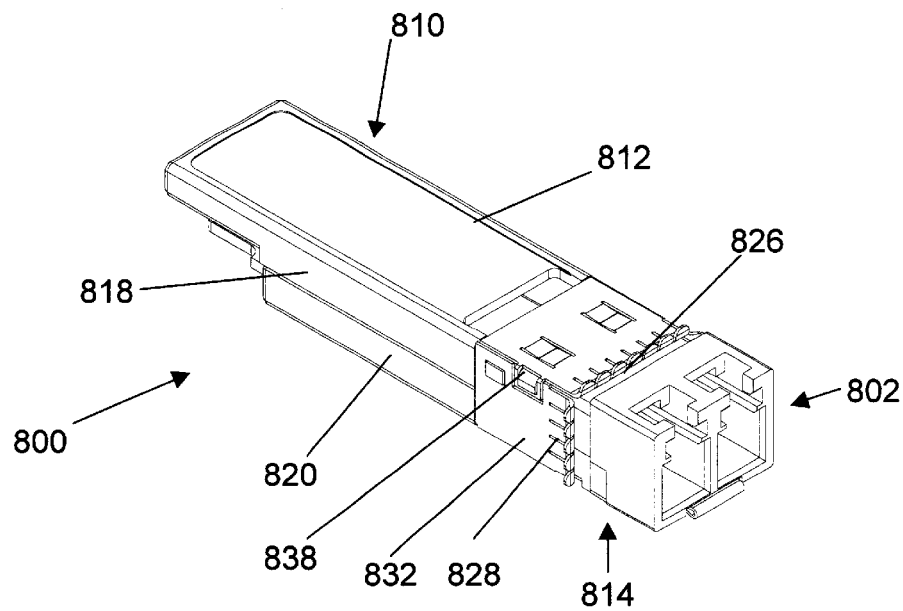
FIG. 8A is a top perspective view of a transceiver of the second embodiment of the present invention.
Figure 8B:
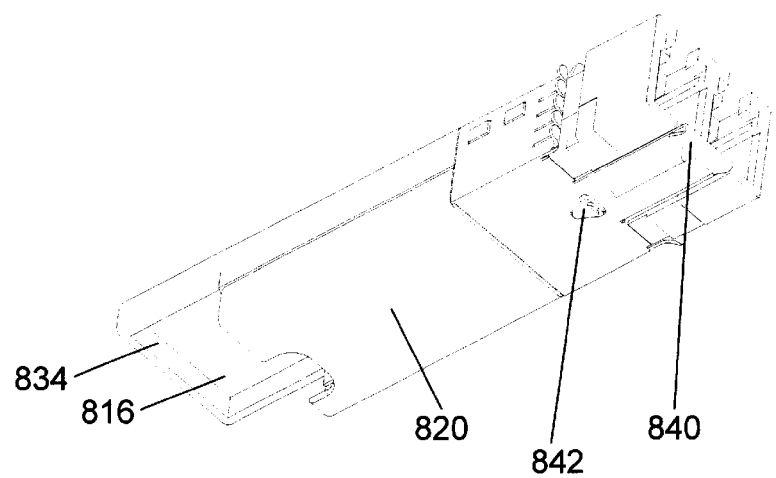
FIG. 8B is a bottom perspective view of the transceiver of FIG. 8A.
Figure 8C:
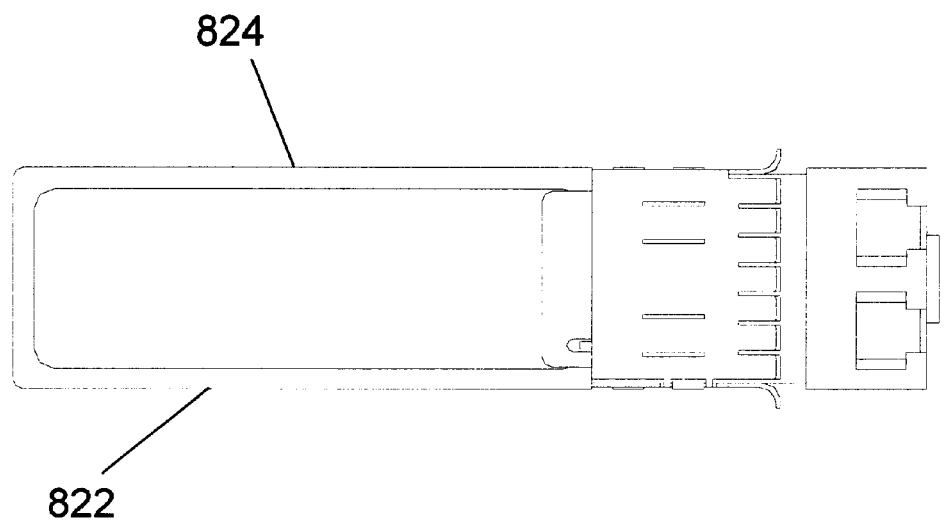
FIG. 8C is a top plan view of the transceiver of FIG. 8A.
Figure 8D:
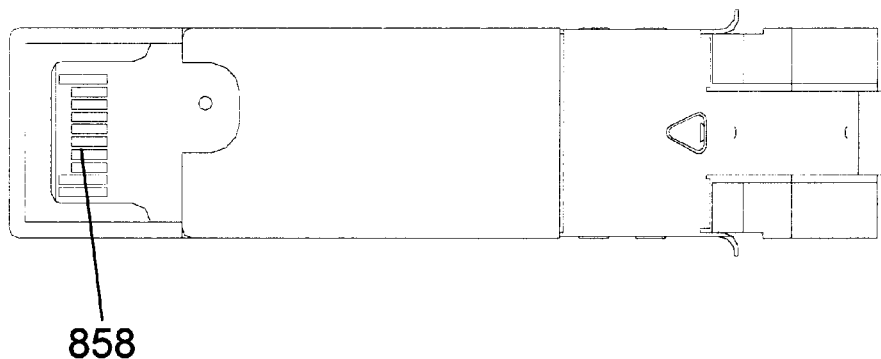
FIG. 8D is a bottom plan view of the transceiver of FIG. 8A in a locked configuration.
Figure 8E:
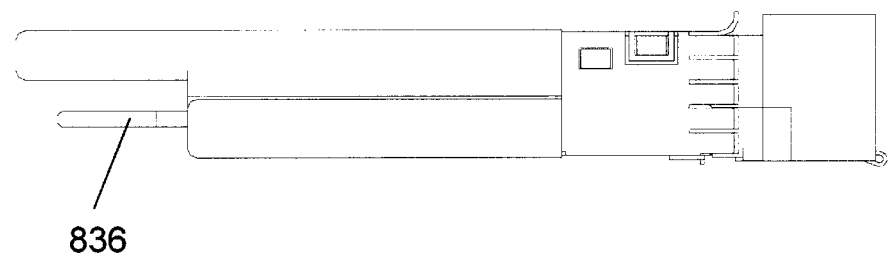
FIG. 8E is a left plan view of the transceiver of FIG. 8A.
Figure 8F:
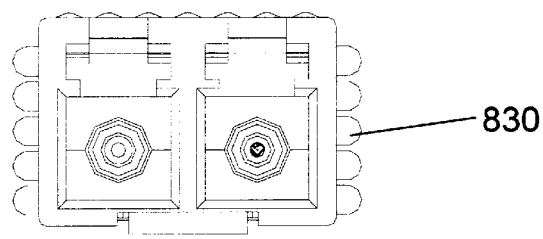
FIG. 8F is a proximal view of the transceiver of FIG. 8A.
Figure 8G:
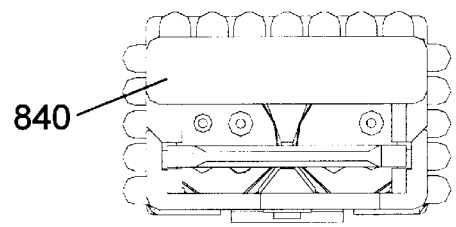
FIG. 8G is a distal view of the transceiver of FIG. 8A.

FIG. 7A illustrates a transceiver system 710 of the present invention including a transceiver cage 712 and transceiver 714. Transceiver system 710 is mounted askew in a chassis opening 716. As can be seen, in contrast to the transceiver system of FIG. 6, when transceiver system 710 is mounted askew in chassis opening 716, contact fingers 718 on transceiver cage 712 make relatively good contact with chassis opening 716, because contact fingers 718 have a relatively large maximum bend radius that allows contact fingers 718 to adjust the skewing between transceiver system 710 and chassis opening 716. FIG. 7B illustrates the maximum bend radius r of a representative cage contact finger 718 relative to a surface 720 of transceiver cage 712.

FIGS. 8A, 8B, 8C, 8D, 8E, 8F and 8G illustrate a transceiver 800 of the present invention which is composed of an optical receptacle 802 that is mounted in a transceiver housing 810 includes a body portion 812 including a proximal open end 814, a distal open end 816, a top portion 818, a bottom portion 820, a left side 822 and a right side 824. Proximal open end 814 includes seven top portion external contact fingers 826, five left side external contact fingers 828, and five right side external contact fingers 830 of an EMI collar 832. Extending from top portion 818 is a top portion distal flap 834. Transceiver 800 may preferably be made by die casting. Transceiver 800 may be mounted in a transceiver cage, such as transceiver cage 410.

To assemble transceiver 800, bottom portion 820 and top portion 818 are joined around a PWA 836. EMI collar 832 is wrapped around where a tab 838 is folded to secure EMI collar 832 to transceiver 800. The shape of external contact fingers 826, 828 and 830 ensure a force fit wiping contact on the inner surface of transceiver cage 810 and assist springs 494 and 496 with added ejection force when transceiver 800 is to be ejected from transceiver cage 410. When transceiver 800 is mounted in transceiver cage 410, EMI collar 832 provides a latch release mechanism comprising a finger catch 840 and a triangular pin 842, for transceiver 800 whereby downward force on finger catch 840 will cause catch 446 of transceiver cage 410 to be pushed clear of triangular pin 842 and allow transceiver cage springs 494 and 496 to force transceiver 800 out of transceiver 410.

Figure 9:
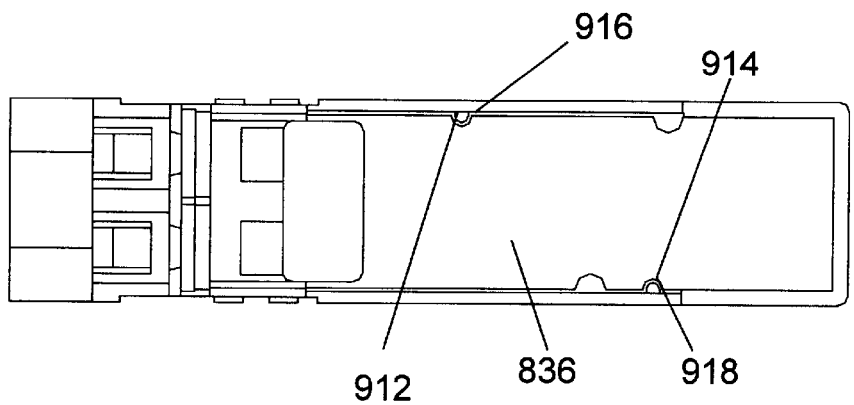
FIG. 9 is bottom plan view of the transceiver of FIG. 8A with the EMI collar of the transceiver removed to show interior detail.
Figure 10:
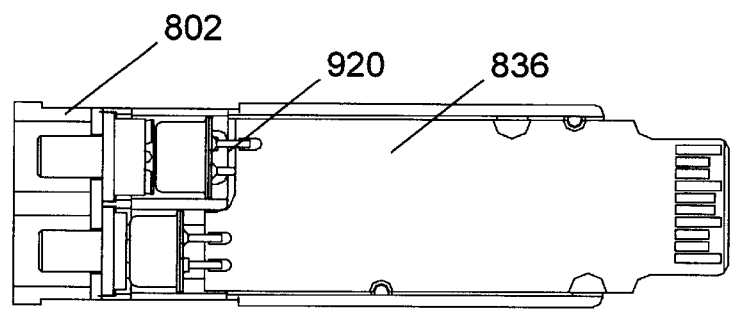
FIG. 10 is a bottom plan view of the transceiver of FIG. 8A with the EMI collar, the top portion of the transceiver, and part of the optical receptacle of the transceiver removed to show interior detail.
Figure 11:
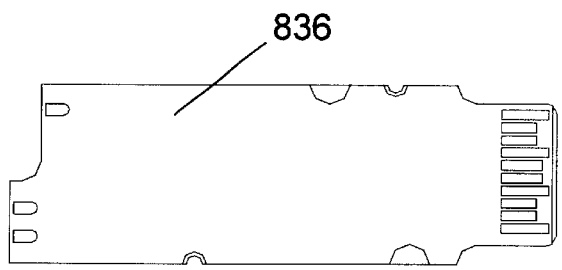
FIG. 11 is a bottom plan view of the PWA of the transceiver of FIG. 8A.

FIG. 9 illustrates transceiver 800 with EMI collar 832 removed to show interior detail. Two ridges 912, 914 of transceiver housing 810 fit into respective notches 916, 918 of PWA 836 to hold PWA 836 in place. FIG. 10 illustrates transceiver 800 with EMI collar 832, top portion 818 and part of optical receptacle 802 removed to illustrate how optical receptacle 802 is electrically connected by pins 920 to PWA 836. FIG. 11 illustrates how PWA 836 appears before being mounted in transceiver 800.

The transceiver housing and cage system of the present invention provides many advantages over existing transceivers and housings. For example, the cage and optical transceiver are connected through EMI contact fingers that touch the inside of the chassis panel hole, as can be seen in the embodiment of FIGS. 5A and 5B. This shields the optical transceiver circuitry from EMI sources inside the host system and blocks the host radiation from exiting the system through the optical transceiver chassis panel opening. The optical transceiver circuitry is also isolated from the chassis and is referenced to host signal common potential through the connector on the host PWA. Connection of chassis and host signal common may be done at the user's option within the host PWB.

The transceiver housing and cage system of the present invention preferably has long mounting pins, preferably between about 0.080" and 0.150" to provide IPC inspectable solder fillets on the solder side of the host PWA of thickness 0.062 to 0.130" and full overlap with internal signal common planes for electromagnetic current return. Preferably the transceiver cage has regularly spaced and symmetric mounting pins, as in the embodiment of the transceiver cage of the present invention illustrated in FIGS. 4A through 4I, to provide mechanical stability during soldering and transceiver insertion, and attenuation of shorter wavelengths of electromagnetic radiation.

The transceiver housing and cage system of the present invention may be assembled using a single piece lapped seam design for both the transceiver housing and cage to allow for continuous flow of electromagnetic currents.

The transceiver housing and cage system of the present invention preferably includes several contact fingers each having a relatively large maximum bend radius to provide contact with the chassis opening, even with mechanical misalignment as shown, for example, in FIGS. 7A and 7B.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A device comprising:
    a uni-body transceiver cage comprising:
        a cage body made of metal for mounting a transceiver within said uni-body transceiver cage, said cage body comprising a top portion, a bottom portion and two sides extending between said top portion and said bottom portion; and
        a plurality of mounting pins extending from said cage body for mounting said uni-body transceiver cage on a printed wiring board, wherein said transceiver comprises a transceiver housing and a transceiver PWA mounted within said transceiver housing.

2. The device of claim 1, wherein said uni-body transceiver cage further comprises a plurality of contact fingers at a proximal open end of said cage body for electrically contacting a chassis through which said uni-body transceiver cage is inserted.

3. The device of claim 2, further comprising a transceiver mounted in said uni-body transceiver cage, wherein said contact fingers are electrically contacted to a chassis and there are openings between said uni-body transceiver cage and said chassis and wherein said openings have a longest dimension no greater than ¼ of the wavelength of electromagnetic radiation corresponding to ten times the highest signal frequency present in said transceiver.

4. The device of claim 2, wherein said transceiver has a highest signal frequency, and wherein at least one pair of said contact fingers are characterized by a contact finger spacing having a longest dimension no greater than ¼ of the wavelength of electromagnetic radiation corresponding to ten times said highest signal frequency.

5. The device of claim 2, in which said plurality of contact fingers are designed for engaging a plurality of transceiver contact fingers on said transceiver.

6. The device of claim 1, wherein said uni-body transceiver cage is designed for soldering onto a printed wiring board.

7. The device of claim 6, wherein said mounting pins are soldered onto a printed wiring board.

8. The device of claim 1, wherein said uni-body transceiver cage is designed for press-fitting onto a printed wiring board.

9. The device of claim 8, wherein said mounting pins are capable of being pressed onto a printed wiring board and being held in place by friction.

10. The device of claim 1, wherein said uni-body transceiver cage further comprises a cage catch for releasably engaging a housing catch of a transceiver housing mounted in said uni-body transceiver cage.

11. The device of claim 1, wherein said uni-body transceiver cage further comprises a mounting opening for engaging a mounting tab on a transceiver mounted in said uni-body transceiver cage for holding said transceiver in said uni-body transceiver cage.

12. The device of claim 1, wherein said uni-body transceiver cage further comprises a spring means located inside a distal end of said uni-body transceiver cage.

13. The device of claim 1, wherein said uni-body transceiver cage further comprises a hinged access door located at a distal end of said uni-body transceiver cage.

14. The device of claim 1, wherein said uni-body transceiver cage is electrically contacted to a chassis.

15. A transceiver cage comprising:

a hollow cage body made of a continuous piece of metal for mounting a transceiver within said transceiver cage and for preventing radiation from outside said cage body from entering said cage body and for preventing radiation from said transceiver from exiting said cage body, said cage body comprising a top portion, a bottom portion and two sides extending between said top portion and said bottom portion; and a plurality of mounting pins extending from said cage body for mounting said transceiver on a printed wiring board, wherein said transceiver comprises a transceiver housing and a transceiver PWA mounted within said transceiver housing.

16. A transceiver cage comprising:

a cage body comprised of metal for mounting a transceiver within said transceiver cage, said cage body comprising a top portion, a bottom portion and two sides extending between said top portion and said bottom portion;

a plurality of mounting pins extending from said cage body for mounting said transceiver cage on a printed wiring board; and a plurality of contact fingers at a proximal open end of said cage body for electrically contacting a chassis through which said transceiver cage is inserted, wherein said transceiver comprises a transceiver housing and a transceiver PWA mounted within said transceiver housing, wherein said transceiver has a highest signal frequency, and wherein at least one pair of said contact fingers are characterized by a contact finger spacing having a longest dimension no greater than ¼ of the wavelength of electromagnetic radiation corresponding to ten times said highest signal frequency.

\* \* \* \* \*